United States Patent

Tofflemire

[15] 3,636,631

[45] Jan. 25, 1972

[54] TEETH-SEPARATING WEDGES FOR USE DURING FILLING OPERATIONS

[72] Inventor: Benjamin F. Tofflemire, 41,301 Crest Drive, Hemet, Calif. 92343

[22] Filed: Dec. 18, 1970

[21] Appl. No.: 99,609

[52] U.S. Cl. ..................................................32/64
[51] Int. Cl. ..............................................A61c 3/00
[58] Field of Search ...............................32/64, 40

[56] References Cited

UNITED STATES PATENTS

| | | | |
|---|---|---|---|
| 1,661,068 | 2/1928 | Gaillard | 32/64 |
| 3,473,226 | 10/1969 | Arlers et al. | 32/64 |
| 3,510,948 | 5/1970 | Walthall | 52/64 |

*Primary Examiner*—Robert Peshock
*Attorney*—Joseph F. Cole

[57] ABSTRACT

Teeth-separating wedges for use during filling operations wherein each wedge has a base rectangular in cross section with an interdental wedge portion projecting lengthwise from the base, the wedge portion being contoured to conform with the interproximal parts of the teeth against which the wedge portion is inserted.

2 Claims, 7 Drawing Figures

PATENTED JAN 25 1972　　　3,636,631
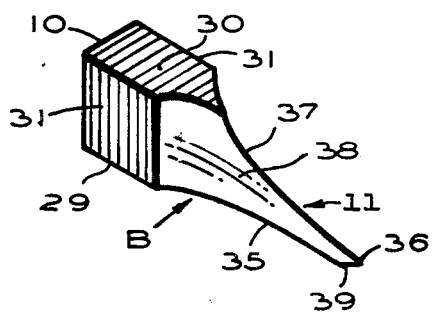
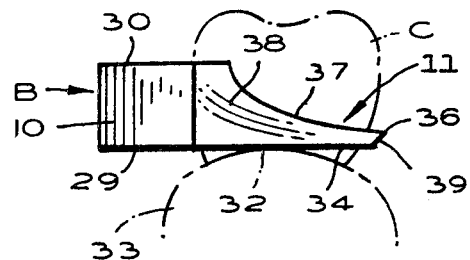
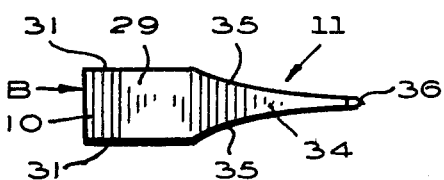
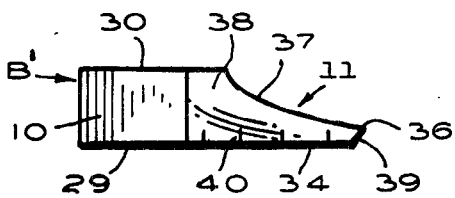
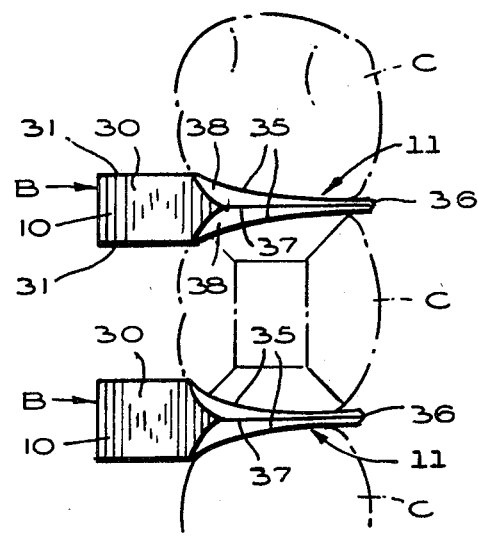
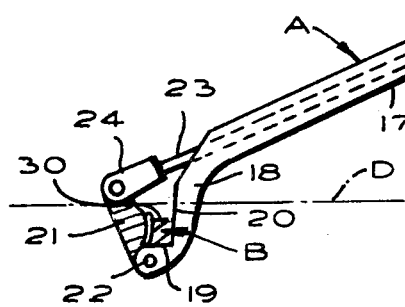
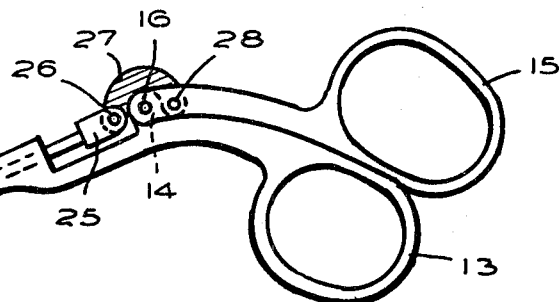
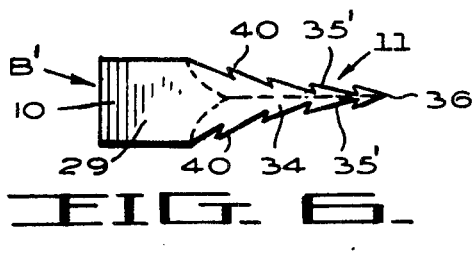
INVENTOR.
BENJAMIN F. TOFFLEMIRE
BY Joseph F. Cole
ATTORNEY

TEETH-SEPARATING WEDGES FOR USE DURING FILLING OPERATIONS

SUMMARY

An object of the present invention is to provide a teeth-separating wedge for use during filling operations of a patient's teeth, the wedge having a base that is rectangular in cross section disposed to be grip by a dental instrument for inserting the wedge between adjoining teeth of the patient, the wedge further having a wedge portion projecting lengthwise from the base for inserting interdentally between the teeth, and this wedge portion being contoured to conform with interproximal parts of the teeth.

Moreover, the base of the wedge is so shaped as to assist the dentist in orienting the wedge as it it being inserted interdentally, and the wedge portion provides an anatomically contoured supporting wall for two contiguous fillings.

Other objects and advantages will appear as the specification proceeds, and the novel features of the invention will be pointed out in the appended claims.

BRIEF DESCRIPTION OF THE DRAWING

For a better understanding of the invention, reference should be made to the accompanying drawing, forming part of this specification, in which:

FIG. 1 is an enlarged isometric view of one of my teeth-separating wedges;

FIG. 2 is a bucco-lingual view of the wedge showing the latter resting on the summit of the alveolar gingival crest of the gingival tissues of the patient;

FIG. 3 is a view looking at the gingival surface of the wedge, that is, from the underneath of the wedge in FIG. 2;

FIG. 4 is an occlusal view of a pair of wedges inserted interdentally between teeth of the patient;

FIG. 5 is a bucco-lingual view of a modified embodiment of the wedge;

FIG. 6 is a gingival view of the wedge shown in FIG. 5, that is, looking from the underside of the latter; and FIG. 7 is a side elevational view of a dental instrument used for inserting and withdrawing the wedges.

DETAILED DESCRIPTION OF THE PREFERRED EMBODIMENTS

Referring now to the drawing in detail, it will be noted that a dental instrument designated generally at A has been provided for use with a teeth-separating wedge B. The latter has a base 10 rectangular in cross section with an interdental wedge portion 11 projecting endwise from the base.

The details of the dental instrument are fully described in my copending patent application, Ser. No. 99,608, filed in the United States Patent Office on Dec. 18, 1970. However, a brief description of the dental instrument will be set forth at this time.

As shown in FIG. 7, the dental instrument A has a supporting handle 13 provided with a lug 14 to which a swingable handle 15 is pivotally secured by journal pin 16, with the latter handle being movable between opened and closed positions relative to the supporting handle. The latter has a stem 17 mounted thereon to extend forwardly therefrom, the stem being provided with a fixed jaw 18 adapted to extend gingivally when the instrument is placed alongside of the patient's teeth C (see FIGS. 2 and 3), either on the buccal (toward cheek) or lingual (toward tongue) of the teeth, and on either upper or lower teeth.

The fixed jaw 18 has a horizontal rest 19 and a vertical shoulder 20 extending occlusally from the horizontal rest 19. The instrument is movable so that the horizontal rest 19 will parallel the occlusal plane D of the patient's teeth. A swingable jaw 21 is disposed forwardly of the fixed jaw 18 and is pivotally secured to the latter by journal pin 22. The wedge B is positioned on the horizontal rest 19 and the swingable jaw 21 is movable toward the fixed jaw 18 to grip the base 10 of the wedge therebetween. Rod 23 is pivotally attached to the swingable jaw 21 by yoke 24, and the rear end of this rod is connected to a second yoke 25, and the latter is coupled by journal pin 26 to one end of a curved link 27, the other end of this link being pivotally connected by journal pin 28 to the swingable handle 15. Thus the latter handle is used for actuating the swingable jaw 21.

In its structural details, the wedge base 10 defines flat gingival and occlusal surfaces 29 and 30, respectively, and further defines opposite lateral sides 31 extending between the gingival and occlusal surfaces. The flat gingival and occlusal surfaces 29 and 30, respectively, parallel one another. The dentist may observe the occlusal surface 30 so that the gingival surface 29 will parallel the occlusal plane D, and the wedge B may be oriented so that it will rest on the summit 32 of the alveolar crest of the gingival tissues 33 and not gouge into these tender tissues (see FIG. 2).

The interdental wedge portion 11 has a flat gingival surface 34 formed as an extension of the gingival surface 29 of the base 10 and arranged in the same plane therewith (see FIG. 2), the gingival surface 34 of the interdental wedge portion 11 having opposite lateral border edges 35 converging forwardly relative to one another to a tip 36 at the front end of the wedge portion 11. Moreover, this interdental wedge portion has an occlusal ridge 37 tapering forwardly from the occlusal surface 30 of the base 10 toward the gingival surface 34 of the wedge portion at the tip. The wedge portion 11 provides opposite walls 38 sloping outwardly relative to one another from the occlusal ridge 37 to the lateral border edges 35 of the wedge portion.

It will be seen that the occlusal ridge 37 defines a curve, and the opposite lateral border edges 35 also define curves, all of these curves flaring outwardly in the direction of the base 10. Moreover, the front tip 36 defines an inclined runner 39 sloping from the gingival surface 34 of the wedge portion to the front end of the occlusal ridge 37 so that the wedge portion 11 may be inserted interdentally between adjoining teeth C, and this runner slopes in a direction to glide over the summit 32 of the alveolar gingival crest without gouging into the gingival tissues 33 thereof.

Turning now to the modified embodiment of the wedge B' shown in FIGS. 5 and 6, it approximates the wedge B previously described, and like reference numerals have been applied to corresponding parts. However, the opposite lateral border edges 35' of the wedge portion 11 are provided with barbs 40 that are shaped and disposed to side over interproximal parts of the adjoining teeth C as the wedge portion 11 is inserted therebetween, and these barbs are made to engage the interproximal parts of the teeth to resist accidental dislodgement of the wedge B'.

These wedges B and B' are so shaped that their spreading action is accomplished gingivally to the normal contact point area of adjoining teeth C, and at the same time over compensate for the thickness of a dental matrix band that is to be applied around a tooth being filled. The opposite sloping walls 38 provide anatomically contoured supporting walls for two contiguous fillings. The wedges may be made from any suitable material, such as wood, or they may be produced by extrusion, making uniform contoured parts by precision dies, and they may be made of texturized semiresilient plastic material.

Inasmuch as the wedges are properly contoured to fit against the parts of the teeth in the interproximal areas, no bucco-lingual horizontal groove is left in the interdental surface of the finished filling. Thus the creation of an interdental pocket, which would catch and retain residual food material, is avoided.

I claim:

1. In a teeth-separating wedge for use during filling operations of a patient's teeth:

a. a base rectangular in cross section with an interdental wedge portion projecting lengthwise from the base;

b. the base defining flat gingival and occlusal surfaces paralleling one another, and further defining opposite lateral sides extending between the gingival and occlusal surfaces;

c. the interdental wedge portion having a flat gingival surface formed as an extension of the gingival surface of the base and arranged in the same plane therewith, the gingival surface of the interdental wedge portion having opposite lateral border edges that converge forwardly relative to one another to a tip at the front end of said wedge portion;

d. the interdental wedge portion further having an occlusal ridge tapering forwardly from the occlusal surface of the base toward the gingival surface of said wedge portion at the tip;

e. said wedge portion providing opposite walls sloping outwardly relative to one another from the occlusal ridge to the lateral border edges of said wedge portion;

f. the front tip defining an inclined runner sloping from the gingival surface of said wedge portion to the front end of the occlusal ridge so that said wedge portion may be inserted interdentally between adjoining teeth and the runner sloping in a direction to glide over the summit of the alveolar gingival crest without gouging into the gingival tissues thereof.

2. In a teeth-separating wedge for use during filling operations of a patient's teeth:

a. a base rectangular in cross section with an interdental wedge portion projecting lengthwise from the base;

b. the base defining flat gingival and occlusal surfaces paralleling one another, and further defining opposite lateral sides extending between the gingival and occlusal surfaces;

c. the interdental wedge portion having a flat gingival surface formed as an extension of the gingival surface of the base and arranged in the same plane therewith, the gingival surface of the interdental wedge portion having opposite lateral border edges that converge forwardly relative to one another to a tip at the front end of said wedge portion;

d. the interdental wedge portion further having an occlusal ridge tapering forwardly from the occlusal surface of the base toward the gingival surface of said wedge portion at the tip;

e. said wedge portion providing opposite walls sloping outwardly relative to one another from the occlusal ridge to the lateral border edges of said wedge portion;

f. and the opposite lateral border edges of said wedge portion being provided with barbs that are shaped and disposed to slide over interproximal parts of the adjoining teeth as the wedge portion is inserted therebetween, and these barbs being made to engage with said parts of the teeth to resist accidental dislodgment of the wedge.

* * * * *